United States Patent
Takayanagi

(10) Patent No.: US 9,521,734 B2
(45) Date of Patent: Dec. 13, 2016

(54) STATIC ELIMINATOR FOR PARTS FEEDER

(71) Applicant: TRINC Corporation, Hamamatsu, Shizuoka-pref (JP)

(72) Inventor: Makoto Takayanagi, Hamamatsu (JP)

(73) Assignee: Trinc Corporation, Hamamatsu (JP)

(*) Notice: Subject to any disclaimer, the term of this patent is extended or adjusted under 35 U.S.C. 154(b) by 122 days.

(21) Appl. No.: 14/031,733

(22) Filed: Sep. 19, 2013

(65) Prior Publication Data

US 2014/0376146 A1 Dec. 25, 2014

(30) Foreign Application Priority Data

Jun. 21, 2013 (JP) .................................. 2013-130105
Sep. 19, 2013 (JP) .................................. 2012-208499

(51) Int. Cl.
*H05F 3/06* (2006.01)
*B65G 47/14* (2006.01)
*H01T 23/00* (2006.01)

(52) U.S. Cl.
CPC ............. *H05F 3/06* (2013.01); *B65G 47/1407* (2013.01); *B65G 47/1421* (2013.01); *H01T 23/00* (2013.01); *B65G 2207/10* (2013.01)

(58) Field of Classification Search
CPC ... H05F 3/06; B65G 47/1047; B65G 47/1421; H01T 23/00
See application file for complete search history.

(56) References Cited

U.S. PATENT DOCUMENTS

| | | | |
|---|---|---|---|
| 5,403,383 A * | 4/1995 | Jaisinghani ....................... 95/69 |
| 7,561,403 B2 * | 7/2009 | Onezawa et al. ............. 361/231 |
| 2003/0140853 A1* | 7/2003 | Wada et al. ................... 118/715 |
| 2010/0089015 A1* | 4/2010 | Takayanagi ..................... 55/431 |
| 2010/0155196 A1* | 6/2010 | Takayanagi ............ B65G 27/00 198/771 |

FOREIGN PATENT DOCUMENTS

JP 2010-168215 8/2010

* cited by examiner

*Primary Examiner* — Thienvu Tran
*Assistant Examiner* — Tien Mai
(74) *Attorney, Agent, or Firm* — Leighton K. Chong

(57) ABSTRACT

The static eliminator for parts feeder comprises a hollow cylindrical or truncated conical cup into which air is injected from the upper portion thereof to generate an air stream of negative pressure circling within the cup so as to lift the works up in the air, and an ionized air introduced into the cup to remove the static from the works thus lifted. The static eliminator is disposed above the upper portion of the parts feeder in a space more than the height of the work. The static eliminator is positioned just in front of the place in which the works stop moving due to the static charge.

6 Claims, 5 Drawing Sheets

- ⊕ AIR STREAM FROM FRONT TO REAR OF DRAWING
- ⊙ AIR STREAM FROM REAR TO FRONT OF DRAWING
- ↑ UPWARD AIR STREAM
- ↓ DOWN WARD AIR STREAM
- UPWARD AIR STREAM FROM FRONT TO REAR OF DRAWING
- DOWNWARD AIR STREAM FROM FRONT TO REAR OF DRAWING
- UPWARD AIR STREAM FROM REAR TO FRONT OF DRAWING
- DOWNWARD AIR STREAM FRON REAR TO FRONT OF DRAWING

STATIC ELIMINATOR FOR PARTS FEEDER

TECHNICAL FIELD

This invention relates to a static eliminator for parts feeder for removing static or static charge generated in the parts feeder.

BACKGROUND OF INVENTION

In the conventional invention described in the Japanese Patent Publication 2010-168215, the bowl of the parts feeder is provided with fine air suction openings or introduction openings at its bottom portion and the air is sucked or introduced through suction openings from below to remove the static from the works. In another conventional invention, a vacuum suction nozzle is positioned near or in contact with the bottom portion of the parts feeder, and air ions above the bowl is sucked through the vacuum suction nozzle among the piled up works to remove the static from the works so as to make a smooth movement of works.

REFERENCES OF PRIOR ART

Patent Reference

[Patent reference 1] Japanese Patent Publication 2010-168215

SUMMARY OF INVENTION

The Subject to be Solved by the Invention

Since, in the conventional inventions, the bowl of the parts feeder is provided with fine air suction openings at its bottom portion and the air is sucked through suction openings from below, or a vacuum suction nozzle is positioned near or in contact with the bottom portion of the parts feeder, and air ions above the bowl is sucked through the vacuum suction nozzle within the works, if the vacuum suction is intensified to enhance the efficiency of static elimination, not only ions but also the works are sucked, and as a result, the movement of the works is prevented. Furthermore, the parts feeder would vibrate and repeat the contacts with the works, as a result the chaff or crud would be generated to contaminate the works.

Therefore, it is an object of the invention is to provide a static eliminator for parts feeder which can enhance the efficiency of static removal without hindering the movement of works.

Means of Solving Subject

To accomplish the object, there is provided a static eliminator for parts feeder which comprises a hollow cylindrical or truncated conical cup into which air is injected from the upper portion thereof to generate an air stream of negative pressure circling within the cup so as to lift the works up in the cup, and an ionized air introduced into said cup to remove the static from the works thus lifted. The dust is removed by blow of the air stream circling in the air toward the works Effects of the Invention According to the invention, by disposing the static eliminator above the parts feeder, the static can be removed from the rear side of works and thus the movement of works can be made smoothly, at the same time, the dust can be removed from the works.

Other objects, features, and advantages of the present invention will be explained in the following detailed description of the invention having references to the appended drawings:

BRIEF DESCRIPTION OF DRAWINGS

FIG. 6 is a view showing second embodiment of static eliminator.

DETAILED DESCRIPTION OF THE INVENTION

The static eliminator for parts feeder according to the present invention comprises a hollow cylindrical or truncated conical cup into which air is injected from the upper portion thereof to generate an air stream of negative pressure circling within the cup so as to lift the works up in the air, and an ionized air sucked or introduced into the cup to remove the static from the works thus lifted. The static eliminator is disposed above the upper portion of the parts feeder in a space more than the height of the work, and it is preferable that the static eliminator is positioned just in front of the place in which the works stop moving due to the static charge.

Figure 1:
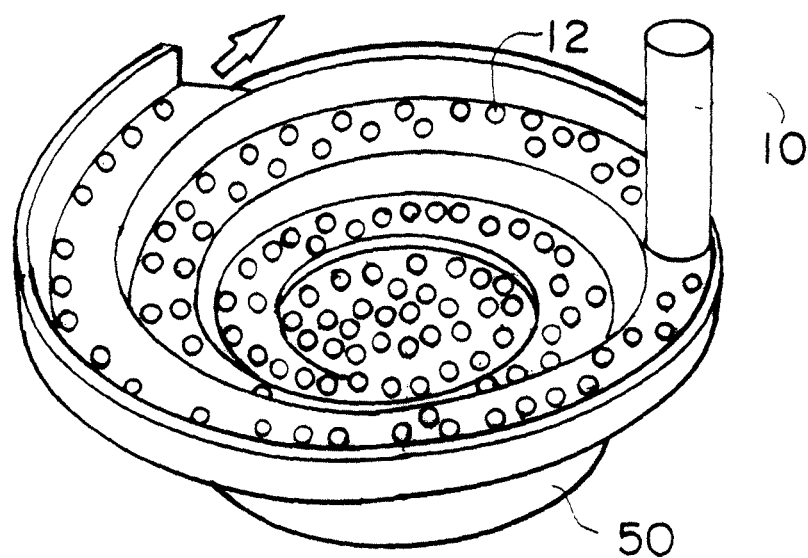
FIG. 1 is a view showing a parts feeder and first embodiment of a static eliminator according to the present invention disposed relative to the parts feeder.

Now, the embodiments will be explained with reference to FIG. 1. The parts feeder 50 formed as a bowl causes the works to move by vibration. The static eliminator 10, schematically shown, is preferably positioned just in front of the place in which the works 12 stop moving due to the static.

First Embodiment

In the first embodiment, the works are piled up high on the bowl of the parts feeder. Although the bowl is caused to vibrate so as to move the works, the works and bowl are electrostatically charged and as a result the works come to stop by electrostatic attraction.

Figure 2:
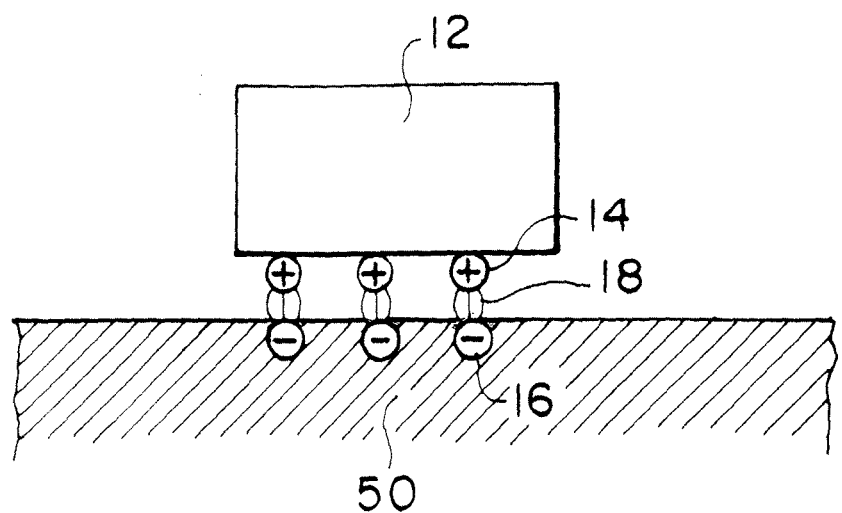
FIG. 2 is a view for explanation about the phenomenon that the works are attached to the bowl of the parts feeder and then works stop.

FIG. 2 is a view for explaining about the phenomenon of stoppage of the works. The static charges are generated at the bottom surfaces of the works 12 due to the fact that the works 12 repeat contact with and friction with the surfaces of the bowl 50. The static charge of the works induces static charge of opposite polarity on the surface of the bowl and as a result coulomb attraction functions between the works and the bowl and finally the works stop moving. The reference numeral 18 indicates electric flux line.

In the present invention, the static eliminator is positioned above the bowl just in front of the place in which the works 12 stop moving due to the static. The works are sucked upwardly and lifted high and are caused to dance widely in the static eliminator by the cyclone and tornado generated by the static eliminator 10. At the same time, the air ion is introduced in the cyclone and tornado. The introduced air ion eliminates the static of works. As a result, the static of the works is neutralized to eliminate the electrostatic attraction between the bowl and the works. Thus, the works can be moved.

Figure 3:
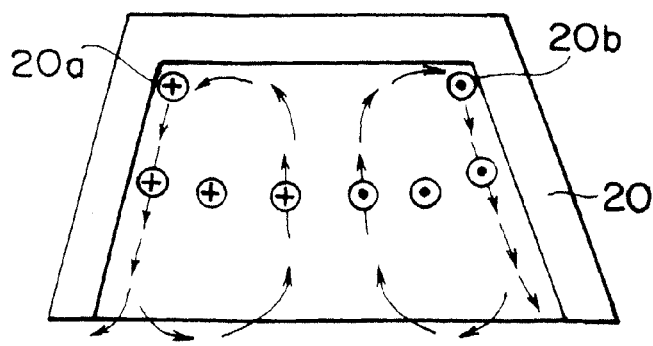
FIG. 3 is a view for explain about cyclone and tornado generated within the cup.

Now, cyclone, tornado, and other air streams generated within the static eliminator 10 will be explained with reference to FIG. 3. The cup 20 is of trapezoidal or rectangular form in vertical cross section and of circular form in horizontal cross section, and is opened at its bottom portion. The cup is formed with air injection openings 20a and 20b. High-speed air is injected or introduced through the air injection openings along the inner wall in a direction tangential to the wall and as a result the cyclone is generated along the inner wall. The cyclone goes downward from the upper portion of the cup to the bottom portion of the wall while circling by centrifugal force, and then at the bottom portion diffuses outside of the cup in a horizontal direction. The cyclone causes the air in a stationary state to rotate and go down, and as a result the negative pressure is generated in the upper central portion of the cup. Then a circling air stream (tornado) which moves upward from the bottom toward the negative pressure is generated. The tornado lifts the works on the bowl up by suction and causes the works to dance widely while causing the works to circle. At that time since ions are included in the tornado (the detail will be explained hereinafter), the static charge is removed from the whole surface of the works.

Figure 4:
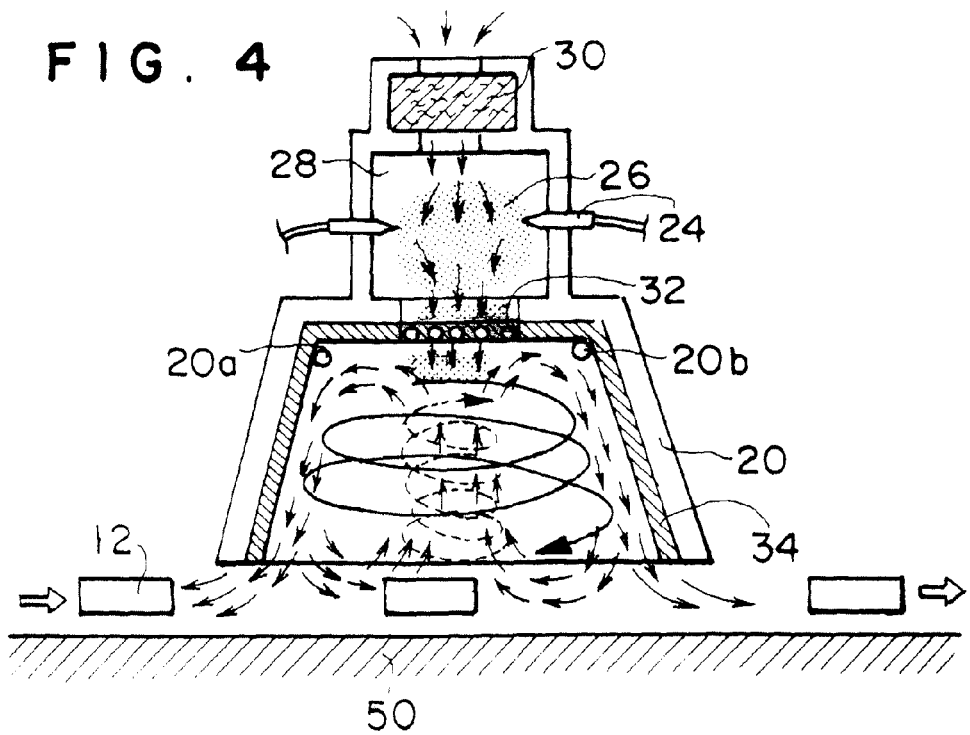
FIG. 4 is a view showing the static eliminator as a whole.

The static eliminator as a whole will be explained with reference to FIG. 4.
1) The bowl 50 is disposed at lowermost place, and the works 50 is moved on the surface of the bowl by vibration of bowl.
2) The static eliminator 10 is disposed above the bowl higher than the height of the works.
3) The cup 20 is provided at its upper portion with an ion chamber for generating ions 26. Discharge needles 24 are disposed within the ion chamber 28. The discharge needles are applied with high voltage to discharge corona so as to make air ions, that is, ionized air.
4) A filer 30 is disposed above the ion chamber 28 and prevents the dust from coming in when air is sucked from outside.
5) The air ions thus made in the ion chamber 28 is sucked into the cup 20 by the negative pressure within the cup.
6) An earth electrode 32 is provided at the exit of the ion chamber so that the electric field emitted from the discharge needles will not enter the cup and will not electrostatically destroy the works.
7) The buffer material 34 is provided at the inner wall of the cup 20 so that the works which dance widely will not come into collision with the inner wall.

Figure 5:
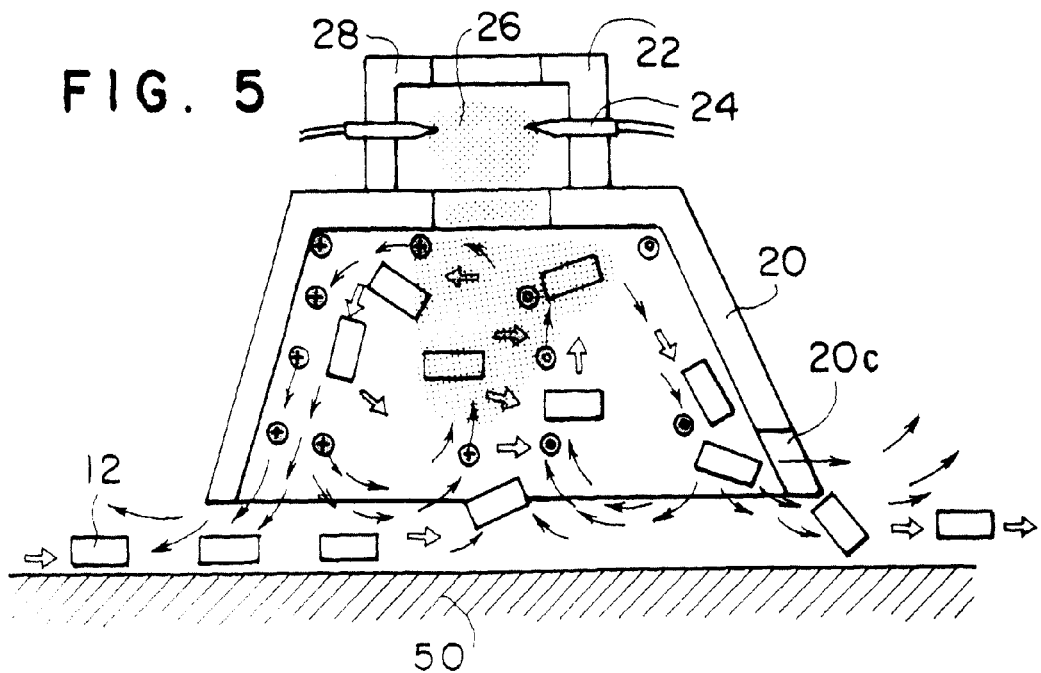
FIG. 5 is a view for explaining about the movement of works in the cup of the static eliminator.

The movement of works will be explained with reference to FIG. 5.
1) The work which comes just in front of the cup 20 catches air stream from the cup in a horizontal direction. The horizontal air stream including ions comes in between the work and the bowl to weaken the static charge that the work has at its under portion. As a result, the tornado will cause the work to easily lift up.
2) The work which moves in the cup 20 is sucked up and lifted up by tornado and the negative pressure.
3) Since the tornado is an ionized air stream, the static is completely removed from the entire surface of the work.
4) The work moves upward while rotating and revolving together with the tornado.
5) As the upward moving work revolves faster, the work is caused to move toward the inner wall by centrifugal force.
6) Since the intensive cyclone flows along the inner wall, the work moves downward together with the cyclone.
7) The work which has reached the bottom portion of the cup is discharged outside of the cup in a horizontal and tangential direction.
8) If the cup is provided with a notch at its side wall, the work is discharged through the notch in a certain direction.

Second Embodiment

Figure 6A:
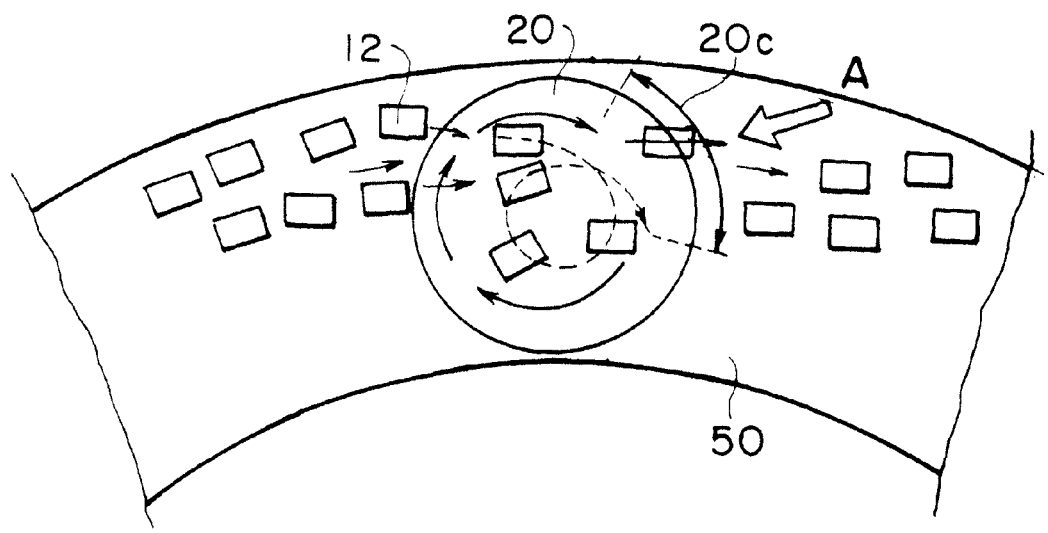
FIG. 6A is its plan view and FIG. 6B is a view from Arrow A in FIG. 6A.
Figure 6B:
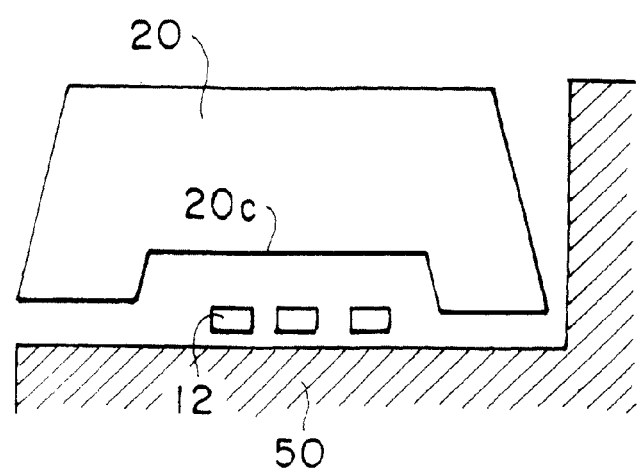

The second embodiment will be explained with reference to FIG. 6. FIG. 6 shows a discharge mechanism of the work, FIG. 6A is a plan view and FIG. 6B is a view seen from the Arrow A.
1) The work which moves on the bowl arrives at a place that the work is below the static eliminator.
2) At first, the static is eliminated by injecting the ionized ions into the space between the work and bowl by the cyclone.
3) The work which has moved within the cup is lifted up by the tornado and the negative pressure.
4) The work moves upward while rotating and revolving.
5) As the work revolves faster, the work is caused to move toward the inner wall.
6) The work which has arrived at the inner wall moves downward while circling along the inner wall.
7) If the cup is provided with a notch at its side wall, the work is discharged through the notch 20c. If not, the work reaches the bottom portion of the cup.
8) If the notch is formed or provided in a desired direction, such as in the direction as the work move, the work can be discharged out in its moving direction.

Third Embodiment

Figure 7:
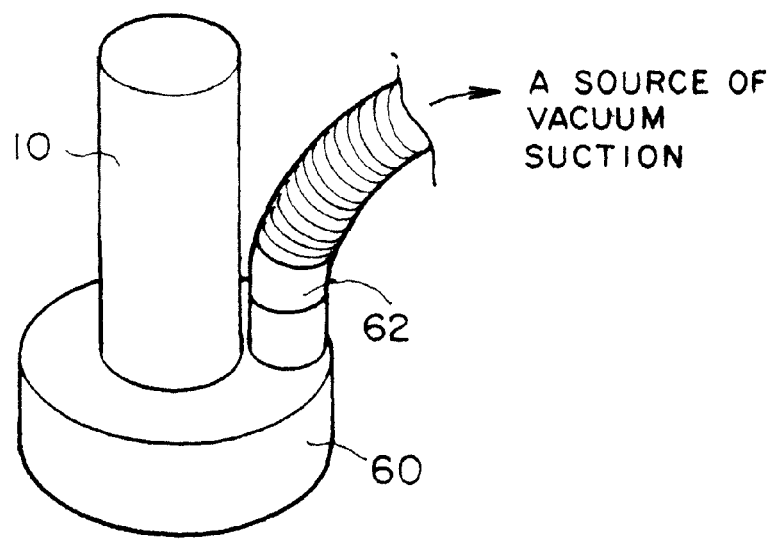
FIG. 7 is a perspective view showing third embodiment of static eliminator.
Figure 8:
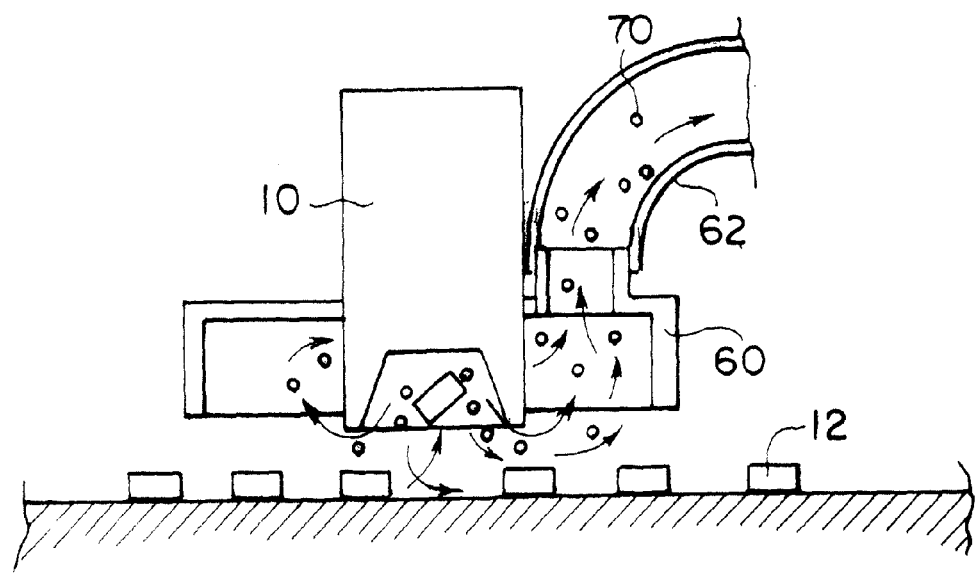
FIG. 8 is a view for explaining about the dust removal in the third embodiment.

The third embodiment will be explained with reference to FIG. 7. In the static eliminator the cup is circumferentially provided with a hood 60 at its bottom portion, the hood 60 is provided with a duct 62, and the dust 70 (see FIG. 8) is sucked through the duct 62 by a source of vacuum, not shown. FIG. 8 is a cross-sectional view for explaining about its motion. The work which is lifted up by the tornado generated by the negative pressure within the cup is electrostatically eliminated by ions included in the tornado and at the same time the dust is blown away. Thus the work is electrostatically eliminated and cleaned. The dust thus blown away is sucked through hood and then is collected.

It is understood that many modifications and variations may be devised given the above description of the principles of the invention. It is intended that all such modifications and variations be considered as within the spirit and scope of this invention, as it is defined in the following claims.

The invention claimed is:

1. A static eliminator for a parts feeder comprising:
   a bowl to which vibration is applied for moving works on a surface of the bowl, having a static eliminator cup of which a bottom portion thereof is opened in a downward direction toward said surface of said bowl and being separated from said surface by a distance sufficient for allowing said works to pass through,
   said static eliminator cup being provided, in a center part of a top wall of an upper portion thereof, with an ion generating chamber for ionizing air introduced from outside to be ionized air and an ionized air injection opening through said top wall into the upper portion of the static eliminator cup, said ionized air being sucked by negative pressure in said static eliminator cup into said static eliminator cup, said static eliminator cup being further provided with, at opposites sides of an upper portion on an inner side wall thereof below said ionized air injection opening, a pair of air injection openings for injecting air into said static eliminator cup directed in a diagonally downward tangential direction for injecting air into said eliminator cup in a diagonally downward tangential direction along said inner side wall of said static eliminator cup so as to generate a downwardly circling cyclone flow of air within said inner side wall of said static eliminator cup, and a negative pressure of air at said upper portion caused by centrifugal force of said cyclone and an upwardly circling tornado flow of air caused by said negative pressure.

2. A static eliminator for a parts feeder according to claim 1 in which said ionized air is generated by needles within an ion chamber and an earth electrode is provided at the air injection opening of said cup so that an electric field leaked from said needles will not adversely affect said works.

3. A static eliminator for a parts feeder according to claim 1 in which said ionized air is injected in a horizontal and tangential direction relative to the inner side wall of said cup between said works and the bowl of said cup to eliminate static from said works.

4. A static eliminator for a parts feeder according to claim 1 in which the inner side wall of said cup is provided with a buffer material.

5. A static eliminator for a parts feeder according to claim 1 in which said cup is provided with a notch at its bottom portion.

6. A static eliminator for a parts feeder according to claim 1 in which said cup is circumferentially provided with a hood from which air is vacuum sucked to collect dust separated from said works.

* * * * *